UNITED STATES PATENT OFFICE.

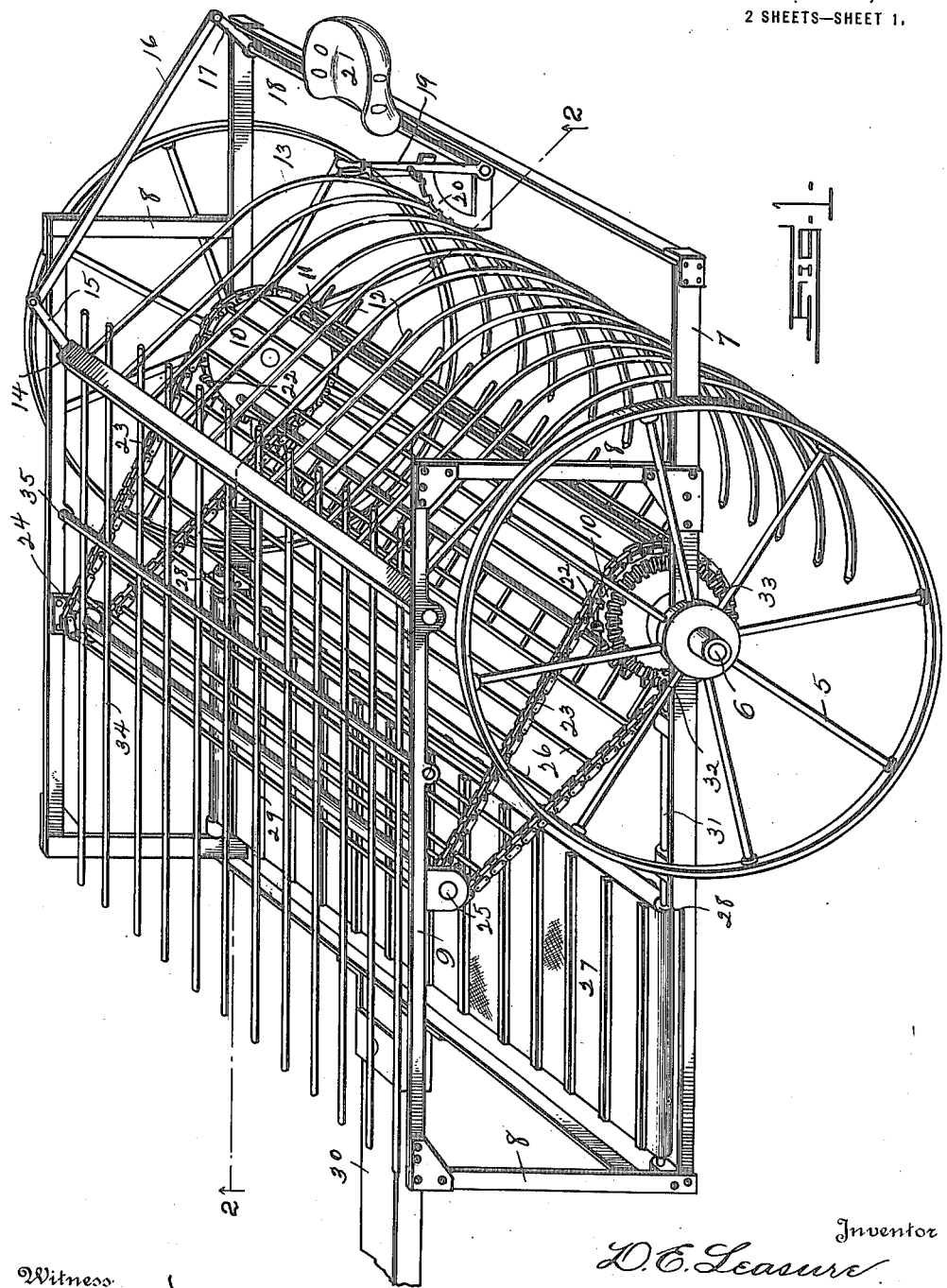

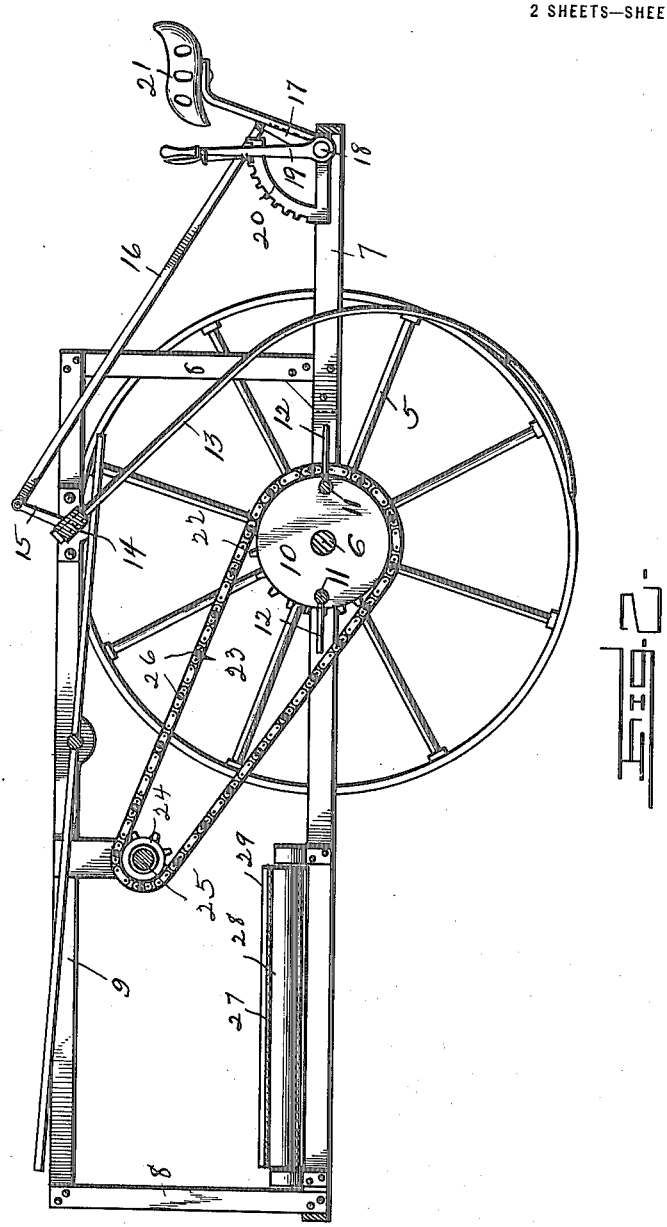

DAVID E. LEASURE, OF BRADFORD, KANSAS.

SIDE-DELIVERY HAY-RAKE.

1,166,136.  Specification of Letters Patent. Patented Dec. 28, 1915.

Application filed June 7, 1915. Serial No. 32,651.

*To all whom it may concern:*

Be it known that I, DAVID E. LEASURE, a citizen of the United States, residing at Bradford, in the county of Wabaunsee and State of Kansas, have invented certain new and useful Improvements in Side-Delivery Hay-Rakes, of which the following is a specification.

This invention relates to side delivery hay rakes and it has for its object the provision of an improved device of this character constructed in such manner that when it is driven over a field to be raked the hay will be gathered up and continuously delivered in windrows at one side of the line of travel of the machine, whereby the necessity of frequently lifting the main raking teeth to discharge the hay, is avoided.

Further objects and advantages of the invention will be set forth in the detailed description which now follows.

In the accompanying drawing:—Figure 1 is a perspective view of a side delivery hay rake constructed in accordance with the invention, and, Fig. 2 is a longitudinal sectional view therethrough.

Like numerals designate corresponding parts in both of the figures of the drawing.

Referring to the drawing, 5 designates ground wheels which are mounted upon a shaft 6. This shaft is journaled in a frame comprising sills 7, uprights 8 and longitudinally extending frame members 9. The shaft 6 carries disks 10 between which bars 11 extend and with which disks said bars bodily rotate. The bars 11 carry a series of teeth 12. The disks 10 are preferably concentrically disposed within the main rake teeth 13, said teeth being carried by a transverse rock bar 14 to which rocking motion may be imparted by crank arm 15, link 16, crank arm 17, shaft 18 and operating handle 19, the latter operating in the usual and well known manner over a segment 20 and being readily accessible from a driver's seat 21. The disks 10 are provided with sprocket teeth 22 which drive sprocket chains 23, said sprocket chains passing over small sprocket wheels 24 mounted upon a transverse shaft 25. The sprocket chains 23 carry transverse rods 26, this construction providing an elevator for the hay as will be hereinafter set forth. A carrier movable transverse to the line of travel of the machine is formed by an endless belt 27 which passes over rollers 28 and this belt is preferably provided with cleats or slats 29, though these may be omitted if desired. A tongue 30 provides means for attaching a team to the machine. The shaft of one of the rollers 28 is extended at 31 and carries a pinion 32 which meshes with a gear wheel 33 that is secured to one of the disks 10. A grating comprising slats 34 and cross bar 35 prevents undesirable elevating of the hay and aids in confining it to the proper path of movement.

The operation of the device is as follows: During the forward movement of the machine and with the teeth 13 in their lowered position, it is apparent that a mass of hay will be raked up into the concavity formed by said teeth. The teeth 12 acting within said cavity continually drags the mass of hay up on top of the elevator formed by cross bars 26 and chains 23. The hay is carried upwardly by this elevator but is prevented from being discharged over the top of the machine and from blowing rearwardly by the slats 34. The hay is discharged over the front end of the elevator and falls upon the transverse conveyer 27 by which it is discharged to one side of the line of travel of the machine and since the action just described is a continuous one it follows that the hay will be deposited in windrows along the line of travel of the rake.

While the elements shown and described are well adapted to serve the purpose for which they are intended, it is to be understood that the invention is not limited to the precise construction set forth but that it includes within its purview whatever is new and within the spirit of the appended claim.

Having described my invention, what I claim is:—

A side delivery hay rake comprising in combination, a horizontally disposed frame, a pair of uprights secured to each of the side members of said frame, longitudinally extending top bars secured to said uprights, a bar mounted to rock between said top bars a set of rake teeth carried by the said last named bar, a driver's seat mounted upon the rear of said horizontally disposed frame member, means for rocking said last named bar from said driver's seat, a transversely disposed rod supported between the longitudinally extending top bars of the frame, a plurality of longitudinally extending slats carried by said rod and constituting a grating, a transversely extending shaft supported to rotate between said longitudinally extending top bars, ground wheels upon which the horizontally disposed frame member is mounted, an inclined conveyer, the upper portion of which passes over said shaft, and the lower portion of which is driven by said ground wheels, and a transversely acting conveyer movable across the lower forward portion of the horizontally disposed frame member, and means for driving said conveyer from said ground wheels.

In testimony whereof I affix my signature in presence of two witnesses.

DAVID E. LEASURE.

Witnesses:
W. B. PARMITER,
G. E. HOBBS.